US010594869B2

(12) United States Patent
Hera et al.

(10) Patent No.: US 10,594,869 B2
(45) Date of Patent: Mar. 17, 2020

(54) MITIGATING IMPACT OF DOUBLE TALK FOR RESIDUAL ECHO SUPPRESSORS

(71) Applicant: BOSE CORPORATION, Framingham, MA (US)

(72) Inventors: Cristian M. Hera, Lancaster, MA (US); Elie Bou Daher, Marlborough, MA (US)

(73) Assignee: BOSE CORPORATION, Framingham, MA (US)

( * ) Notice: Subject to any disclaimer, the term of this patent is extended or adjusted under 35 U.S.C. 154(b) by 106 days.

(21) Appl. No.: 15/668,237

(22) Filed: Aug. 3, 2017

(65) Prior Publication Data
US 2019/0045066 A1 Feb. 7, 2019

(51) Int. Cl.
H04M 9/08 (2006.01)
H04B 3/23 (2006.01)
H04M 3/00 (2006.01)

(52) U.S. Cl.
CPC ............ H04M 9/082 (2013.01); H04B 3/23 (2013.01); H04M 3/002 (2013.01); H04M 9/08 (2013.01)

(58) Field of Classification Search
CPC .......... H04B 3/23; H04M 3/002; H04M 9/08; H04M 9/082; H04R 3/00; H04R 5/027; H04S 7/00
USPC ................. 84/609; 348/14.03; 375/222, 350; 379/88.07, 390.02, 406.01, 406.05, 379/406.08, 406.09, 406.14, 406.06; 381/22, 57, 71.1, 86, 66; 455/570; 702/191; 704/226
See application file for complete search history.

(56) References Cited

U.S. PATENT DOCUMENTS

| 5,146,470 A | * | 9/1992 | Fujii | H04B 3/23 375/350 |
| 5,371,789 A | * | 12/1994 | Hirano | H04M 9/082 370/290 |
| 5,400,394 A | * | 3/1995 | Raman | H04B 3/23 370/290 |
| 5,641,927 A | * | 6/1997 | Pawate | G10H 1/366 434/307 A |

(Continued)

FOREIGN PATENT DOCUMENTS

| EP | 2984763 A1 | 2/2016 |
| JP | 2011166484 A | 8/2011 |
| WO | 2014168618 A1 | 10/2014 |

OTHER PUBLICATIONS

Emura et al. "A Method for Posterior Frequency-Domain Multi-Channel Residual Echo Canceling", IEEE International Conference on Acoustics, Speech and Signal Processing (2011), pp. 421-424.

(Continued)

Primary Examiner — Gerald Gauthier
(74) Attorney, Agent, or Firm — Lando & Anastasi, LLP

(57) ABSTRACT

Audio systems and methods of suppressing residual echo are provided that determine spectral mismatches by comparing a spectral density of a residual signal from an acoustic echo canceler to a spectral density of a program content signal. At least one spectral mismatch is stored in memory. The systems and methods select a spectral mismatch to use for calculating a filter coefficient, from among one or more of the stored or actively determined spectral mismatches, and filter the residual signal based upon the calculated filter coefficient.

20 Claims, 8 Drawing Sheets

(56) References Cited

U.S. PATENT DOCUMENTS

| | | | |
|---|---|---|---|
| 5,671,287 A | 9/1997 | Gerzon | |
| 5,960,077 A * | 9/1999 | Ishii | H04B 3/23 379/406.08 |
| 6,041,290 A * | 3/2000 | Matt | H04M 9/082 370/286 |
| 6,185,300 B1 * | 2/2001 | Romesburg | H04M 9/082 379/406.09 |
| 6,438,225 B1 * | 8/2002 | Tahernezhaadi | H04B 3/23 379/406.01 |
| 6,539,091 B1 * | 3/2003 | Schertler | H04M 9/08 379/390.01 |
| 6,570,985 B1 * | 5/2003 | Romesburg | H04B 3/23 379/390.02 |
| 6,574,337 B1 | 6/2003 | Kawada | |
| 6,658,107 B1 | 12/2003 | Sorqvist et al. | |
| 6,799,062 B1 | 9/2004 | Piket et al. | |
| 6,842,516 B1 * | 1/2005 | Armbruster | H04M 9/082 379/390.02 |
| 7,050,575 B1 * | 5/2006 | Romesburg | H04M 9/082 370/289 |
| 7,062,041 B2 * | 6/2006 | Buchner | H04M 9/082 379/406.04 |
| 7,310,425 B1 | 12/2007 | Benesty et al. | |
| 7,359,504 B1 | 4/2008 | Reuss et al. | |
| 7,672,445 B1 * | 3/2010 | Zhang | H04M 9/082 370/286 |
| 7,680,265 B2 * | 3/2010 | Piket | H04M 9/082 379/406.08 |
| 8,233,632 B1 * | 7/2012 | MacDonald | G10L 19/008 379/406.01 |
| 8,295,493 B2 | 10/2012 | Faller | |
| 8,947,992 B2 * | 2/2015 | Little | G06F 1/10 370/201 |
| 9,071,900 B2 * | 6/2015 | Vesa | H04R 5/04 |
| 9,832,569 B1 | 11/2017 | Ayrapetian et al. | |
| 9,854,378 B2 * | 12/2017 | Sun | H04S 7/30 |
| 10,367,948 B2 * | 7/2019 | Wells-Rutherford | G10L 21/0232 |
| 2001/0024499 A1 * | 9/2001 | Hasegawa | H04B 3/23 379/406.08 |
| 2005/0063536 A1 * | 3/2005 | Myllyla | H04M 9/082 379/406.08 |
| 2005/0129226 A1 * | 6/2005 | Piket | H04M 9/082 379/406.01 |
| 2005/0175129 A1 * | 8/2005 | Roovers | H04M 9/082 375/350 |
| 2005/0213747 A1 | 9/2005 | Popovich et al. | |
| 2007/0019803 A1 | 1/2007 | Merks et al. | |
| 2007/0076891 A1 | 4/2007 | Cho | |
| 2007/0258514 A1 * | 11/2007 | Wajcer | H04M 3/002 375/222 |
| 2008/0031467 A1 * | 2/2008 | Haulick | H04M 9/082 381/66 |
| 2008/0101622 A1 * | 5/2008 | Sugiyama | H04M 9/082 381/66 |
| 2008/0112569 A1 * | 5/2008 | Asada | G10K 11/178 381/71.1 |
| 2008/0219463 A1 * | 9/2008 | Liu | H04M 9/082 381/66 |
| 2008/0273714 A1 | 11/2008 | Hartung | |
| 2009/0074177 A1 * | 3/2009 | Takada | H04M 9/082 379/406.01 |
| 2009/0147975 A1 | 6/2009 | Horbach et al. | |
| 2009/0232297 A1 * | 9/2009 | Takada | H04M 9/082 379/406.08 |
| 2009/0304198 A1 | 12/2009 | Herre et al. | |
| 2010/0046762 A1 | 2/2010 | Henn et al. | |
| 2010/0074432 A1 * | 3/2010 | Adeney | H04M 9/082 379/406.08 |
| 2010/0074433 A1 * | 3/2010 | Zhang | H04M 9/082 379/406.08 |
| 2010/0150376 A1 | 6/2010 | Itou | |
| 2010/0215184 A1 * | 8/2010 | Buck | H04M 9/082 381/66 |
| 2010/0303228 A1 * | 12/2010 | Zeng | H04M 9/082 379/406.08 |
| 2011/0019831 A1 * | 1/2011 | Liu | H04M 9/082 381/66 |
| 2011/0058667 A1 * | 3/2011 | Takada | H04M 9/082 379/406.08 |
| 2011/0081024 A1 | 4/2011 | Souldore | |
| 2011/0135105 A1 * | 6/2011 | Yano | H04B 3/235 381/66 |
| 2011/0178798 A1 | 7/2011 | Flaks et al. | |
| 2012/0027216 A1 * | 2/2012 | Tirry | H04M 1/72569 381/57 |
| 2012/0040757 A1 | 2/2012 | Page | |
| 2012/0076308 A1 * | 3/2012 | Kuech | H04M 9/082 381/22 |
| 2012/0093348 A1 | 4/2012 | Li | |
| 2012/0140940 A1 * | 6/2012 | Hwang | H04M 9/082 381/71.1 |
| 2012/0330652 A1 | 12/2012 | Turnbull et al. | |
| 2013/0251169 A1 * | 9/2013 | Awano | H04R 3/02 381/66 |
| 2013/0268267 A1 * | 10/2013 | Hwang | G10L 21/0208 704/226 |
| 2013/0301840 A1 * | 11/2013 | Yemdji | H04M 9/082 381/66 |
| 2013/0304480 A1 | 11/2013 | Kuntz et al. | |
| 2013/0315408 A1 * | 11/2013 | Yano | G10K 11/175 381/66 |
| 2014/0112496 A1 | 4/2014 | Murgia et al. | |
| 2014/0270148 A1 * | 9/2014 | Cleve | H04M 3/002 379/406.08 |
| 2014/0286497 A1 * | 9/2014 | Thyssen | H04R 3/005 381/66 |
| 2014/0357324 A1 * | 12/2014 | Ahgren | H04M 9/082 455/570 |
| 2015/0197195 A1 * | 7/2015 | Hera | B60Q 9/00 381/86 |
| 2015/0215722 A1 | 7/2015 | Milne et al. | |
| 2016/0019909 A1 * | 1/2016 | Shi | H04M 9/082 704/226 |
| 2016/0182770 A1 * | 6/2016 | Ushakov | H04N 7/15 348/14.03 |
| 2016/0309119 A1 | 10/2016 | Lasser | |
| 2017/0006373 A1 | 1/2017 | Bruss | |
| 2017/0047072 A1 | 2/2017 | Eriksson | |
| 2018/0027125 A1 * | 1/2018 | Petri | G06F 17/142 |
| 2018/0343345 A1 * | 11/2018 | Awano | H04B 3/23 |
| 2018/0367674 A1 | 12/2018 | Schalk-Schupp et al. | |
| 2019/0045065 A1 * | 2/2019 | Hera | H04M 9/082 |
| 2019/0045066 A1 * | 2/2019 | Hera | H04B 3/23 |
| 2019/0104360 A1 * | 4/2019 | Bou Daher | H04R 3/005 |

OTHER PUBLICATIONS

Emura, S. "Residual Echo Reduction for Multichannel Acoustic Echo Cancelers With a Complex-Valued Residual Echo Estimate", IEEE/ACM Transactions on Audio, Speech, and Language Processing (2018) vol. 26, No. 3, pp. 485-500.

International Search Report and Written Opinion from International Application No. PCT/US2018/044765 dated Sep. 26, 2018.

Bendat et al., "Random Data Analysis and Measurement Procedures", Wiley (2010), Chapter 7, section 7.1, pp. 201-206.

Hansler et al., "Acoustic Echo and Noise Control: A Practical Approach", Wiley & Sons (2004), Chapter 10, section 10.2, pp. 244-247.

Beaugeant et al., "New optimal filtering approaches for hands-free telecommunication terminals", Signal Processing (1998), pp. 33-47.

Le Bouquin Jeannès et al., "Combined Noise and Echo Reduction in Hands-Free Systems: A Survey", IEEE Transactions on Speech and Audio Processing (Nov. 2001), vol. 9, pp. 808-820.

Ochiai et al., "Echo Canceller with Two Echo Path Models", IEEE Transaction on Communications (1977), pp. 589-595.

Doclo et al., "Combined acoustic echo and noise reduction using GSVD-based optimal filtering", 2000 IEEE International Confer-

(56) References Cited

OTHER PUBLICATIONS ence on Acoustics, Speech, and Signal Processing. Proceedings (Cat. No. 00CH37100), vol. 2, pp. II061-II1064. doi: 10.1109/ICASSP.2000.859146. Retrieved from <https://pdfs.semanticscholar.org/1784/8d74d9049f759e9eb4b0822201eb3bd9da07.pdf>.
International Search Report and Written Opinion from International Application No. PCT/US2018/044760 dated Oct. 18, 2018.
International Search Report and Written Opinion from International Application No. PCT/US2018/044762 dated Oct. 30, 2018.

* cited by examiner

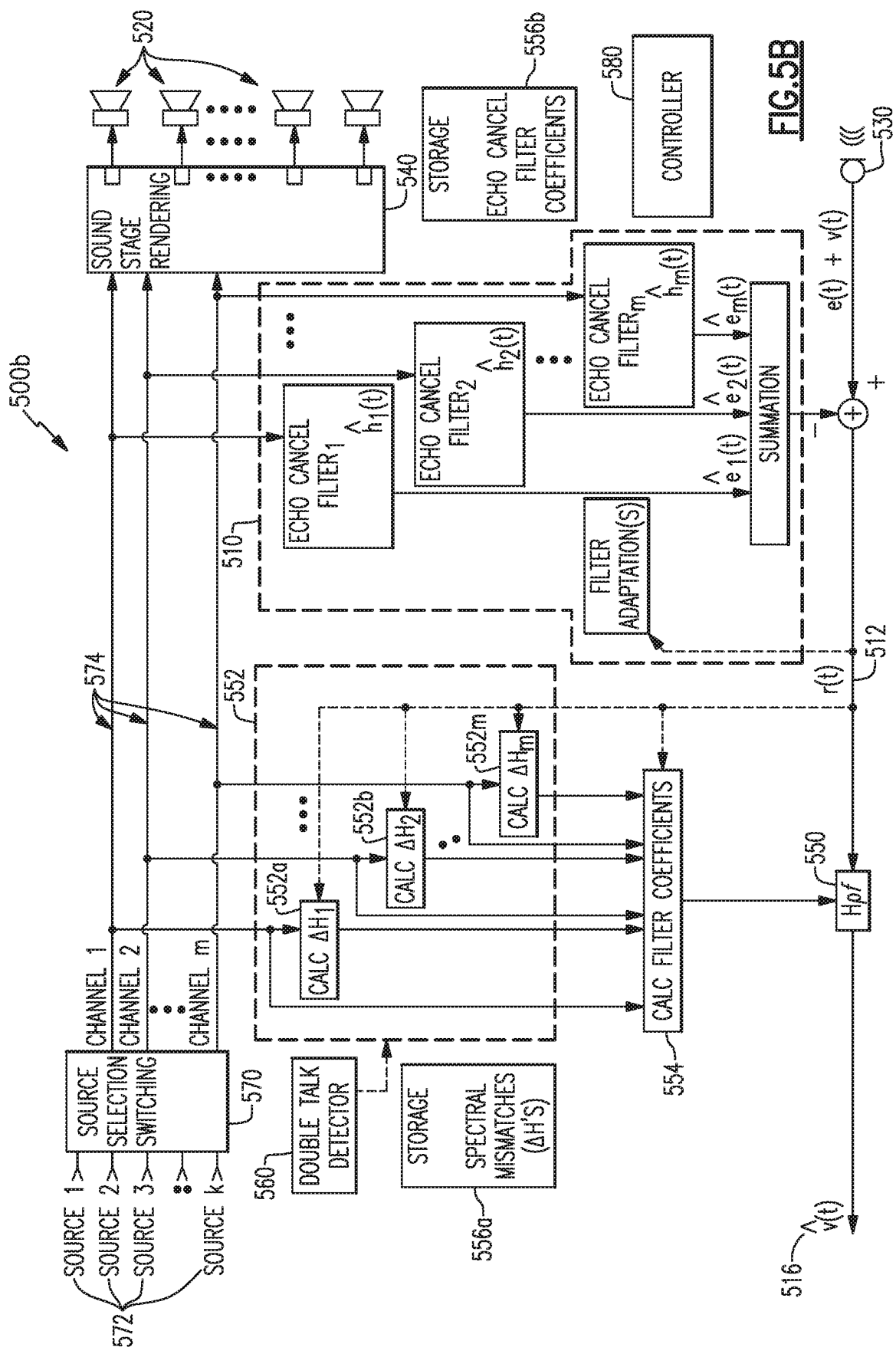

MITIGATING IMPACT OF DOUBLE TALK FOR RESIDUAL ECHO SUPPRESSORS

CROSS REFERENCE TO RELATED APPLICATIONS

This application is related to U.S. patent application Ser. No. 15/667,988 titled EFFICIENT REUTILIZATION OF ACOUSTIC ECHO CANCELER CHANNELS filed on Aug. 3, 2017, and to U.S. patent application Ser. No. 15/668,073 titled MULTI-CHANNEL RESIDUAL ECHO SUPPRESSION filed on Aug. 3, 2017, each of which is incorporated herein by reference in its entirety for all purposes.

TECHNICAL FIELD

Aspects and examples of the present disclosure are directed generally to voice and audio systems and methods, and in some examples, more specifically to systems and methods for removing acoustic echo signals from microphone signals.

BACKGROUND

Audio systems, especially automobile audio systems, are used to produce acoustic signals for various purposes such as entertainment (e.g., music, talk radio, sports), navigation (e.g., route guidance), and communication (e.g., telephone calls). Some such audio systems include one or more microphones intended to pick up a user's voice for certain applications, such as the near end of a telephone call or for commands to a virtual personal assistant. The acoustic signals produced by the audio system also contribute to the microphone signals, and may undesirably interfere with processing the user's voice signal.

SUMMARY

Aspects and examples are directed to audio residual echo suppression systems and methods that calculate and store spectral mismatch data for use at a later time, to accommodate delay in detecting a double talk condition, or to accommodate changing sound stage rendering parameters or configurations. For example, a residual echo suppression post filter operates using calculated filter coefficients that, in some examples, are attenuation multipliers for a number of individual frequency bins. The filter coefficients are calculated or determined from, at least in part, a detected mismatch between an echo cancelation filter and an actual echo path, e.g., the echo cancelation filter may not perfectly model the actual echo path, resulting in residual echo. The spectral mismatch may be optimally determined for a particular sound stage rendering scheme and while a user is not speaking. A double talk detector may be used to indicate the presence of a user's speech signal and to pause the calculation of spectral mismatch. The double talk detector, however, may not perfectly and instantaneously detect when a user starts to speak. Accordingly, aspects and examples disclosed herein accommodate double talk detection latency by storing previously determined spectral mismatches and selecting from them when double talk is detected.

According to one aspect, a method of suppressing residual echo is provided and includes determining a first spectral mismatch of an acoustic echo canceler based upon a program content signal and a residual signal, storing the first spectral mismatch in a memory, determining a second spectral mismatch of the acoustic echo canceler based upon the program content signal and the residual signal at a different time than the first spectral mismatch, selecting one of the first spectral mismatch or the second spectral mismatch, calculating a filter coefficient based upon the selected spectral mismatch, filtering the residual signal based upon the calculated filter coefficient.

In some examples, determining the first and second spectral mismatches includes at least comparing a spectral density of the residual signal to a spectral density of the program content signal.

According to some examples, selecting one of the first spectral mismatch or the second spectral mismatch is based at least in part upon detecting a double-talk condition.

In some examples, selecting one of the first spectral mismatch or the second spectral mismatch is based at least in part upon a sound stage configuration selected for rendering the program content signal into an acoustic signal.

Certain examples include storing additional spectral mismatches in the memory to provide a plurality of stored spectral mismatches. In some examples, selecting one of the first spectral mismatch or the second spectral mismatch includes selecting one of the plurality of stored spectral mismatches based upon a sound stage configuration selected for rendering the program content signal into an acoustic signal. Some examples include detecting a double talk condition, and selecting one of the first spectral mismatch or the second spectral mismatch includes selecting one of the plurality of stored spectral mismatches based on an amount of time for the double talk condition to be detected.

Some examples also include storing an association of the first spectral mismatch with a sound stage configuration selected for rendering the program content signal into an acoustic signal.

According to another aspect, a residual echo suppression system is provided that includes a content signal input configured to receive an audio signal, a residual input configured to receive a residual signal from an echo cancelation system, a processor and a memory, the processor configured to determine a plurality of spectral mismatches, each of the plurality of spectral mismatches based at least upon the residual signal and the audio signal, the memory configured to store the plurality of spectral mismatches, and the processor further configured to calculate a set of filter coefficients based at least in part upon a selected one of the plurality of spectral mismatches, and a filter configured to filter the residual signal using the calculated set of filter coefficients.

In some examples, the processor is further configured to select the selected one of the plurality of spectral mismatches based at least in part upon an indication from a double talk detector.

Certain examples include a double talk detector configured to indicate to the processor when a local user is speaking, the processor further configured to select the selected one of the plurality of spectral mismatches based at least in part upon the indication.

In certain examples the processor is further configured to select the selected one of the plurality of spectral mismatches based at least in part upon an amount of time for a double talk detector to detect a double talk condition.

In some examples, the processor is further configured to select the selected one of the plurality of spectral mismatches based at least in part upon a sound stage configuration selected for rendering the program content signal into an acoustic signal.

In some examples, the memory is further configured to store an association of at least one of the plurality of spectral mismatches with a sound stage configuration selected for rendering the program content signal into an acoustic signal.

According to yet another aspect, an audio system is provided that includes a plurality of inputs, each of the plurality of inputs to receive an audio signal, a signal processing subsystem coupled to the plurality of inputs and configured to provide a processed signal based upon at least a portion of the plurality of audio signals to a loudspeaker for rendering an acoustic signal, a microphone input to receive a microphone signal having an echo component of the acoustic signal, an echo cancelation subsystem configured to provide an estimated echo signal from the plurality of audio signals, to receive the microphone signal, and to subtract the estimated echo signal from the microphone signal to provide a residual signal, and a residual echo suppression subsystem configured to determine and store in memory a first spectral mismatch between the residual signal and at least one of the plurality of audio signals, to determine a second spectral mismatch between the residual signal and the at least one of the plurality of audio signals, to select one of the first spectral mismatch or the second spectral mismatch upon which to calculate a set of filter coefficients, and to filter the residual signal using the set of filter coefficients.

In some examples, the residual echo suppression subsystem is configured to select the one of the first spectral mismatch or the second spectral mismatch based at least in part upon an indication from a double talk detector.

In certain examples, the residual echo suppression subsystem is configured to select the one of the first spectral mismatch or the second spectral mismatch based at least in part upon a sound stage configuration selected for rendering the program content signal into an acoustic signal.

In some examples, the residual echo suppression subsystem is further configured to determine and store additional spectral mismatches in the memory to provide a plurality of stored spectral mismatches.

In some examples, the residual echo suppression subsystem is configured to select the one of the first spectral mismatch or the second spectral mismatch by selecting one of the plurality of stored spectral mismatches based on an amount of time for a double talk detector to detect a double talk condition.

In certain examples, the residual echo suppression subsystem is configured to select the one of the first spectral mismatch or the second spectral mismatch by selecting one of the plurality of stored spectral mismatches based upon a sound stage configuration selected for rendering the program content signal into an acoustic signal.

In certain examples, the residual echo suppression subsystem is configured to store an association of the first spectral mismatch with a sound stage configuration selected for rendering the program content signal into an acoustic signal.

Still other aspects, examples, and advantages are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures:

FIG. 5B is a schematic diagram of another example audio system including multi-channel echo cancelation and residual echo suppression;

DETAILED DESCRIPTION

Figure 1:
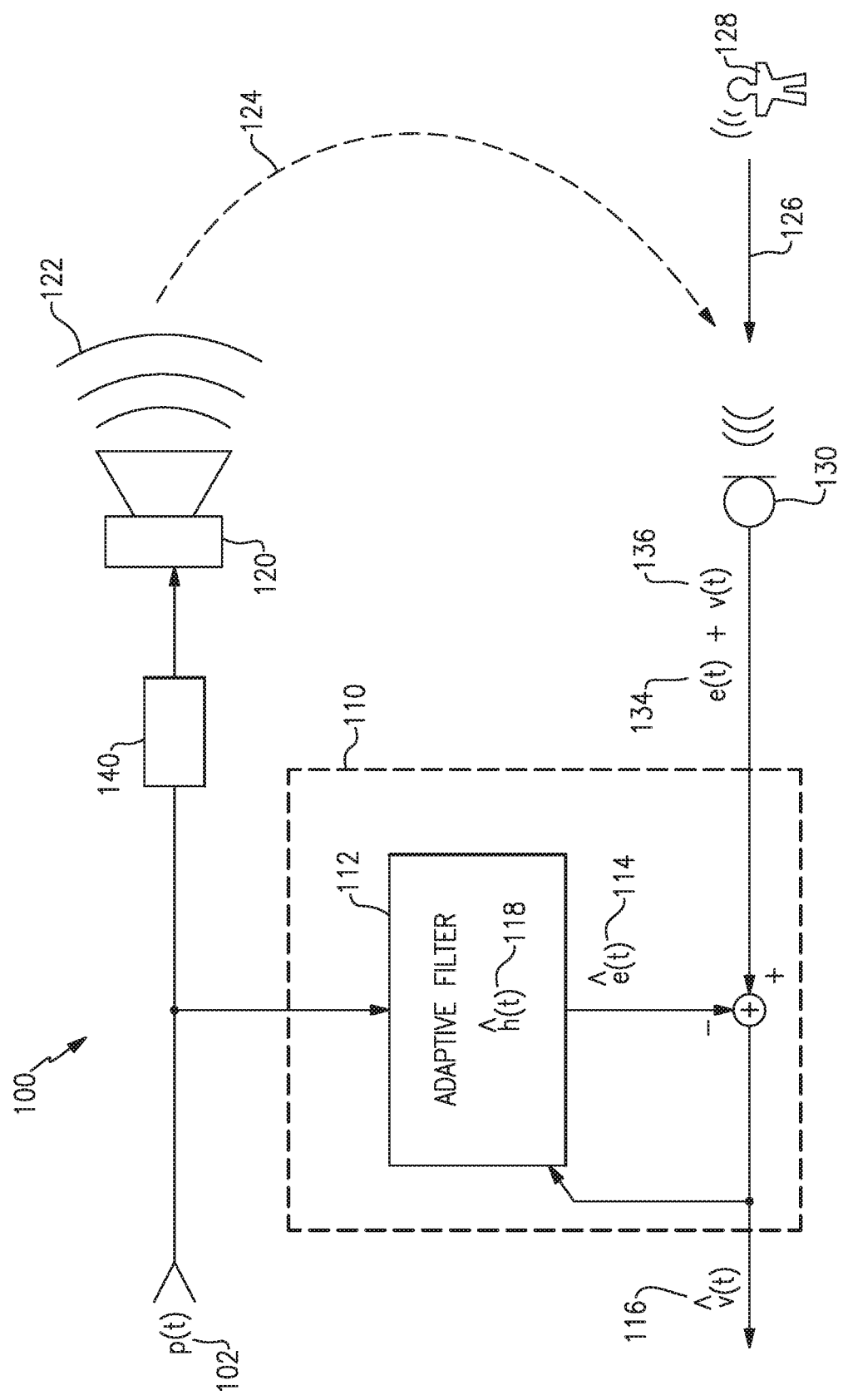
FIG. 1 is a schematic diagram of an example audio system including echo cancelation.

Aspects of the present disclosure are directed to audio systems and methods that provide echo reduction. Acoustic echo cancelers may fail to completely remove an echo component in a microphone signal, leaving a residual echo component. Aspects and examples disclosed herein reduce (e.g., suppress) the residual echo in the microphone signal after the action of one or more acoustic echo cancelers, and are adapted to improve performance when a double talk condition is detected.

Audio systems, especially automotive audio systems, may produce acoustic signals in an environment, e.g., a vehicle compartment, for the benefit of people in the environment. The acoustic signals may be for entertainment, information, communication, and navigation, for example. Such audio systems may also accept acoustic input from the occupants, e.g., one or more people may verbally speak and their voices may be picked up by the audio system, e.g., via one or more microphones, for various purposes such as telephone conversations, verbal commands to a navigation system or a virtual personal assistant, and the like. When the audio system renders an acoustic signal, e.g., via a loudspeaker, the microphone(s) may also pick up the rendered acoustic signal in addition to the user's voice. For example, the user may be having a phone conversation and listening to the radio at the same time, and the microphone will pick up both the user's voice and the radio program. A portion of the microphone signal may therefore be due to the audio system's own acoustic production, and that portion of the microphone signal is deemed an echo signal. In such cases, an acoustic echo canceler may be used to reduce or remove the echo signal portion from the microphone signal. When multiple loudspeakers and/or multiple audio signal sources are used, there may be multiple acoustic echo cancelers involved. After the action of one or more echo cancelers, a portion of the echo signal may remain, and is deemed a residual echo. Aspects and examples disclosed herein suppress the residual echo by applying a post filter ("post" refers to the filter's action occurring after the echo canceler). The post filter applies spectral enhancement to reduce (suppress) spectral content that is likely due to residual echo and not a user's vocalizations, thereby enhancing the speech content in the signal relative to the non-speech content.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 illustrates an example audio system 100 that includes an echo canceler 110, one or more acoustic drivers 120, and one or more microphones 130. The audio system 100 receives a program content signal 102, p(t), that is converted into an acoustic program signal 122 by the one or more acoustic drivers 120. The acoustic drivers 120 may have further processing component(s) 140 associated with them, such as may provide array processing, amplification, equalization, mixing, etc. Additionally, the program content signal 102 may include multiple tracks, such as a stereo left and right pair, or multiple program content signals to be mixed or processed in various ways. The program content signal 102 may be an analog or digital signal and may be provided as a compressed and/or packetized stream, and additional information may be received as part of such a stream, such as instructions, commands, or parameters from another system for control and/or configuration of the processing component(s) 140, the echo canceler 110, or other components.

The block diagrams illustrated in the figures, such as the example audio system 100 of FIG. 1, are schematic representations and not necessarily illustrative of individual hardware elements. For instance, in some examples, each of the echo canceler(s) 110, the processing component(s) 140, and other components and/or any portions or combinations of these, may be implemented in one set of circuitry, such as a digital signal processor, a controller, or other logic circuitry, and may include instructions for the circuitry to perform the functions described herein.

A microphone, such as the microphone 130, may receive each of an acoustic echo signal 124, an acoustic voice signal 126 from a user 128, and other acoustic signals such as background noise and/or road noise. The microphone 130 converts acoustic signals into, e.g., electrical signals, and provides them to the echo canceler 110. Specifically, when a user 128 is speaking, the microphone 130 provides a voice signal 136, v(t), and an echo signal 134, e(t), as part of a combined signal to the echo canceler 110. The echo canceler 110 functions to attempt to remove the echo signal 134 from the combined signal to provide an estimated voice signal 116, $\hat{v}$(t). The echo canceler 110 works to remove the echo signal 134 by processing the program content signal 102 through a filter 112 to produce an estimated echo signal 114, $\hat{e}$(t), which is subtracted from the signal provided by the microphone 130.

For example, the acoustic program signal 122 causes the echo signal 134. If the filter 112 performs well at providing an estimated echo signal 114, it will perform well at removing the echo signal 134 from the signal provided by the microphone 130. As a result, the estimated voice signal 116, $\hat{v}$(t), will be a good representation of the actual voice signal 136, v(t).

The echo canceler 110 may include an adaptive algorithm to update the filter 112, at intervals, to improve the estimated echo signal 114. Over time, the adaptive algorithm causes the filter 112 to converge on satisfactory parameters that produce a sufficiently accurate estimated echo signal 114. Generally, the adaptive algorithm updates the filter during times when the user 128 is not speaking, but in some examples the adaptive algorithm may make updates at any time. When the user 128 speaks, such is deemed "double talk," and the microphone 130 picks up both the acoustic echo signal 124 and the acoustic voice signal 126. Regarding the terminology, the user 128 is "talking" at the same time as one or more acoustic drivers 120 are producing acoustic program content, or "talking," hence, "double talk."

The filter 112 may apply a set of filter coefficients to the program content signal 102 to produce the estimated echo signal 114, $\hat{e}$(t). The adaptive algorithm may use any of various techniques to determine the filter coefficients and to update, or change, the filter coefficients to improve performance of the filter 112. In some examples, the adaptive algorithm may operate on a background filter, separate from the filter 112, to seek out a set of filter coefficients that performs better than an active set of coefficients being used in the filter 112. When a better set of coefficients is identified, they may be copied to the filter 112 in active operation.

Such adaptive algorithms, whether operating on an active filter or a background filter, may include, for example, a least mean squares (LMS) algorithm, a normalized least mean squares (NLMS) algorithm, a recursive least square (RLS) algorithm, or any combination or variation of these or other algorithms. The filter 112, as adapted by the adaptive algorithm, converges to apply an estimated transfer function 118, $\hat{h}$(t), which is representative of the overall response of the processing 140, the acoustic driver(s) 120, the acoustic environment, and the microphone(s) 130, to the program content signal 102. The transfer function is a representation of how the program content signal 102 is transformed from its received form into the echo signal 134.

While the echo canceler 110 works to remove the echo signal 134 from the combined microphone signal, rapid changes and/or non-linearities in the echo path prevent the echo canceler 110 from providing a precise estimated echo signal 114 to perfectly match the echo signal 134, and a residual echo will remain at the output. According to aspects and examples enclosed herein, the residual echo is reduced, or suppressed, by the addition of a post filter to spectrally enhance the estimated voice signal 116.

Figure 2:
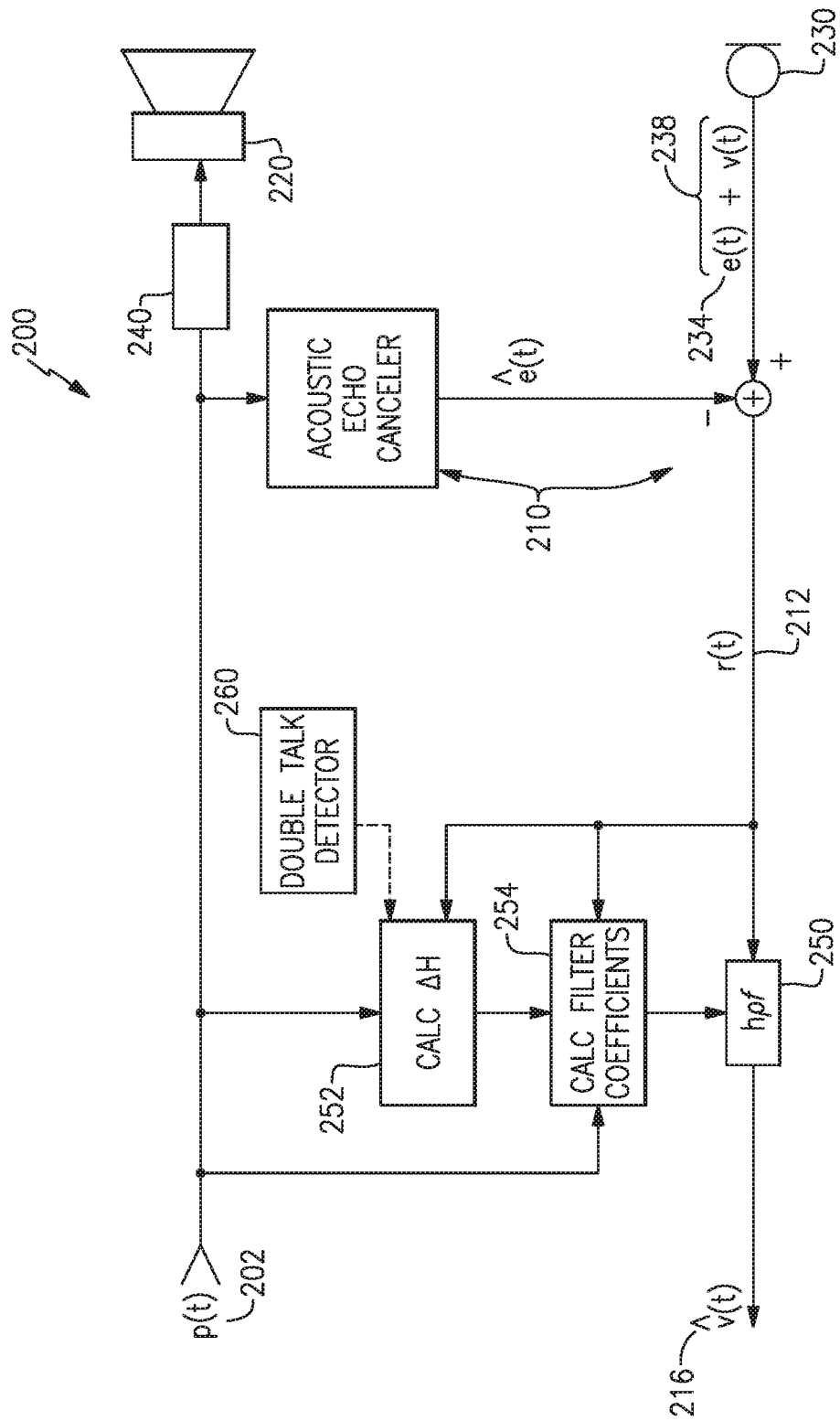
FIG. 2 is a schematic diagram of an example audio system including residual echo suppression.

FIG. 2 illustrates an example audio system 200 that includes an echo canceler 210, one or more acoustic drivers 220, one or more microphones 230, audio signal processing 240, and a post filter 250. Similar to the audio system 100 of FIG. 1, the audio system 200 receives a program content signal 202 and converts it into an acoustic program signal by the one or more acoustic drivers 220, and the echo canceler 210 operates to remove or reduce an echo signal 234 from a combined signal 238 provided by the microphone 230. The resulting signal 212 may include a residual echo component, as discussed above. The post filter 250 operates to suppress the residual echo component with spectral filtering.

The post filter 250 is supported by a spectral analysis block 252 that characterizes the spectral power and/or spectral content of the resulting signal 212 relative to the program content signal 202. The spectral analysis block 252 calculates a spectral mismatch, ΔH, (also termed echo mismatch herein) between the actual echo path and the acoustic echo canceler 210. The actual echo path is, for example, the entire path taken by the program content signal 202 from where it is provided to the echo canceler 210, through the processing 240, the acoustic driver 220, the acoustic environment, and through the microphone 230. The actual echo path may further include processing by the microphone 230 or other supporting components, such as array processing, for example.

To determine the spectral mismatch, the spectral analysis block 252 calculates a ratio of power spectral density of the resulting (residual) signal 212 to the power spectral density of the program content signal 202, across a number of frequency blocks or bins. In simplified mathematical terms, the spectral analysis block 252 calculates ΔH at intervals, in accord with equation (1).

$$|\Delta H|^2 = \frac{S_{rr}}{S_{pp}} \quad (1)$$

Wherein $S_{rr}$ is the power spectral density of the resulting (or residual) signal 212 (from the echo canceler 210) and $S_{pp}$ is the power spectral density of the program content signal 202, which is the ultimate source of the echo. In some examples, the power spectral densities used may be time-averaged or otherwise smoothed or low pass filtered to prevent sudden changes (e.g., rapid or significant changes) in the calculated spectral mismatch.

In some examples, to accurately calculate the echo mismatch, the spectral analysis block 252 may be configured to calculate the echo mismatch only during periods when a double talk condition is not detected, e.g., by a double talk detector 260. For example, when a user is speaking within the acoustic environment of the audio system 200, the resulting signal 212 includes a component that is the user's speech. In this case, the resulting signal 212 is not representative of the residual echo, e.g., the mismatch of the echo canceler 210 relative to the actual echo path, because the user is speaking. Accordingly, the double talk detector 260 operates to indicate when double talk is detected, and the spectral analysis block 252 may stop calculating ΔH during such periods.

Regarding the use of symbols herein, a capital letter, e.g., H, generally represents a term, signal, or quantity in the frequency or spectral domain, and a lowercase letter, e.g., h, generally represents a term, signal, or quantity in the time domain. Relation between time and frequency domain is generally well known, and is described at least under the realm of Fourier mathematics or analysis, and is accordingly not presented herein. Additionally, signals, transfer functions, or other terms or quantities represented by symbols herein may be operated, considered, or analyzed in analog or discrete form. In the case of time domain terms or quantities, the analog time index, e.g., t, and/or discrete sample index, e.g., n, may be interchanged or omitted in various cases. Likewise, in the frequency domain, analog frequency indexes, e.g., f, and discrete frequency indexes, e.g., k, are omitted in most cases. Further, relationships and calculations disclosed herein may generally exist or be carried out in either time or frequency domains, and either analog or discrete domains, as will be understood by one of skill in the art. Accordingly, various examples to illustrate every possible variation in time or frequency domains, and analog or discrete domains, are not presented herein.

As discussed above with reference to equation (1), the spectral analysis block 252 calculates the spectral mismatch, ΔH, across a number of frequency blocks or bins. Any number of frequency bins, across any suitable range of frequencies, may be selected to accommodate varying system requirements. For instance, in certain examples the power spectral density of signals may be taken across 64 frequency bins. In other examples, the signals may be analyzed across any suitable number of frequency bins, or a system adjustable number of frequency bins, for example from 32 frequency bins up to 256 frequency bins or more. Further, the frequency range may be limited to those frequencies deemed important for particular applications, such as the processing of human speech, which generally only requires a narrower frequency range than that which humans are capable of hearing. Accordingly, for example, the program content signal 202 may include content across a spectrum of 20 Hz to 20,000 Hz, while the microphone 230, the echo canceler 210, the post filter 250, and the spectral analysis block 252, may be configured to operate on a more limited frequency range, such as up to 5 kHz, 11 kHz, or 12 kHz, for example. In other examples, suitable frequency ranges may include 60 Hz to 8,000 Hz, or 100 Hz to 4,000 Hz, or any other suitable range depending upon the application. A selection of number of frequency bins may be related to a selection of frequency range in some examples, depending upon operating requirements. A broader frequency range may require a higher number of frequency bins to achieve a particular spectral resolution, for example.

As discussed above, the post filter 250 operates to suppress residual echo that is often the result of rapid changes and/or non-linearities in the acoustic environment, such as caused by a person moving his arms or turning his head, for example. Accordingly, the post filter 250 may be required to change its operating characteristics more quickly than, for example, an adaptive algorithm associated with the echo canceler 210. The spectral analysis block 252 may therefore be configured to calculate the spectral mismatch, ΔH, at a rather rapid rate, over short time intervals, e.g., many times per second.

In some examples, the ratio of power spectral densities, as described by equation (1), may be time averaged over a number of calculations, and the time averaged result may be used as the spectral mismatch, ΔH. For example, the spectral analysis block 252 may calculate a new spectral mismatch, ΔH, at each interval, according to equation (2), where the newly calculated spectral mismatch, ΔH(n), is based upon the ratio of power spectral densities as presented above with respect to equation (1), and the previously calculated spectral mismatch, ΔH(n-1), as well as a time-averaging weighting factor, δ. In other examples, the intervally calculated spectral mismatch may not be time averaged, or may be time averaged by some other suitable function.

$$|\Delta H(n)|^2 = (1-\delta) \cdot \frac{S_{rr}}{S_{pp}} + \delta \cdot |\Delta H(n-1)|^2 \quad (2)$$

Acknowledging the above discussion that the spectral analysis block 252 may be configured to stop calculating new spectral mismatches when double talk is detected, equation (2) may be re-written as equation (3).

$$|\Delta H(n)|^2 = \begin{cases} (1-\delta) \cdot \frac{S_{rr}}{S_{pp}} + \delta \cdot |\Delta H(n-1)|^2 & \text{far end single talk} \\ |\Delta H(n-1)|^2 & \text{otherwise} \end{cases} \quad (3)$$

The above discussion focuses on the operation of the spectral analysis block 252 to determine a spectral mismatch, ΔH, at any given time. Attention is now turned to the operation of the post filter 250 itself, and adaptation of the post filter 250 at particular instants in time by a coefficient calculation block 254. The post filter 250 suppresses residual echo in the resulting signal 212 (from the echo canceler 210) by, in some examples, reducing the spectral content of the resulting signal 212 by an amount related to the likely ratio of the residual echo signal power relative to the total signal power (e.g., speech and residual echo), on a per frequency bin basis.

In various examples, the post filter 250 may be configured to operate in the frequency domain or the time domain. Accordingly, use of the term "filter coefficient" is not intended to limit the post filter 250 to operation in the time domain. The terms "filter coefficients," "tap weights," or other comparable terms, may refer to any set of values applied to or incorporated into a filter to cause a desired response or a desired transfer function. In certain examples, the post filter 250 may be a digital frequency domain filter that operates on the resulting signal 212 to multiply signal content within a number of individual frequency bins by distinct values generally less than or equal to unity. The set of distinct values may be deemed filter coefficients.

In at least one example, the coefficient calculation block 254 calculates and provides to the post filter 250 a set of frequency bin multipliers based upon the calculated spectral mismatch, which may be a frozen or previously calculated quantity, and based upon current or timely spectral content information about the program content signal 202 and the resulting signal 212. As a reminder, the most recently calculated spectral mismatch, as discussed above, may be a frozen value due to the spectral analysis block 252 stopping new calculations when double talk is detected. The current power spectral densities of the resulting signal 212 and the program content signal 202, however, continue to change at each moment in time. Accordingly, in certain examples, when double talk is detected, the spectral analysis block 252 stops calculating, or freezes, the spectral mismatch, ΔH, while the coefficient calculation block 254 continues to calculate and provide filter coefficients to the post filter 250. Accordingly, the post filter 250 may continuously update its operation based upon the current power spectral densities of the resulting signal 212 and the program content signal 202.

As discussed above, the spectral analysis block 252 may stop calculating spectral mismatch during double talk. Because the resulting signal 212 contains more than a residual echo when a user starts to speak, the spectral analysis block 252 might otherwise calculate incorrect spectral mismatches, which cause the coefficient calculation block 254 to calculate less optimal filter coefficients and ultimately cause the post filter 250 to perform less well. In some cases, the post filter 250 may perform so poorly under such conditions that its output estimated voice signal 216 may be a worse representation of the user's voice than if there were no post filter 250 at all.

Accordingly, it is desirable to have a double talk detector capable of instantly detecting when a user starts to speak. In reality, a double talk detector will take an amount of time to determine and to indicate that a user is (or may be) speaking, causing a delay during which spectral mismatch calculations may be corrupted by the presence of the user's voice. To mitigate the impact of this delay in detecting double talk, aspects and examples disclosed herein store a history of calculated spectral mismatches so that coefficient calculation may be based upon a spectral mismatch that was reliably determined when the user was not speaking. The double talk detector 260 may be any suitable system, component, algorithm, or combination thereof, and its performance may be accommodated by systems and methods disclosed herein.

Figure 3:
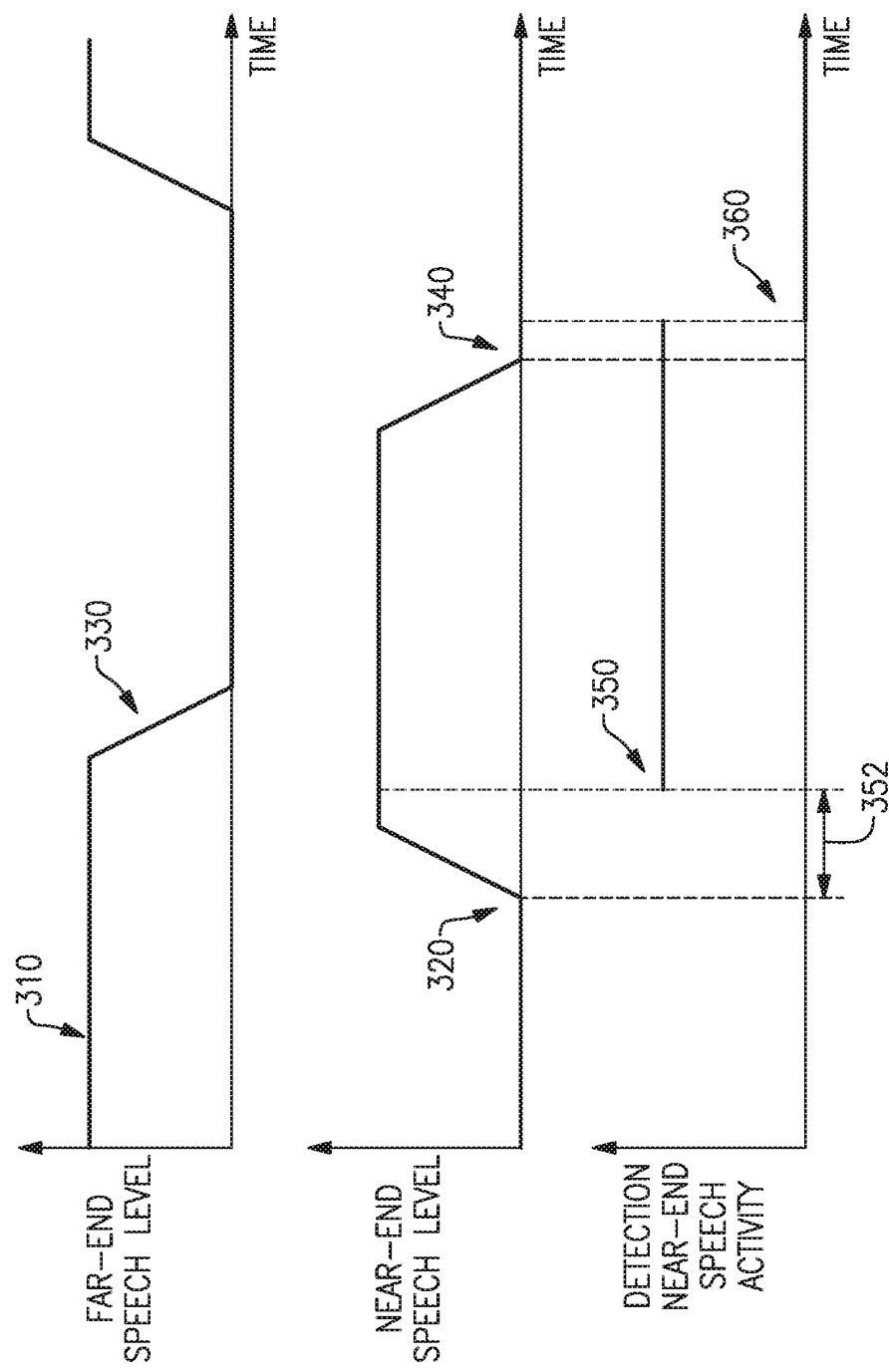
FIG. 3 is a timing diagram of audio system signals and events for an example use scenario.

FIG. 3 shows an example timing of audio system signals and events for a sample telephone conversation to illustrate the delay in double talk detection and its impact on such a system. A far end user is talking during a period 310. The far end user is the remote half of the telephone conversation, and is a person with whom a near end user is having a conversation. The near end user begins talking at point 320, perhaps causing the far end user to stop talking at point 330. While the near end user is speaking, from point 320 to point 340, newly calculated spectral mismatches may be inaccurate due to the presence of the near end user's voice in a microphone signal, e.g., in addition to an echo signal. A double talk detector cannot instantly detect that the near end user is speaking at point 320, and may not indicate the near end speech activity until point 350, after a delay 352. Additionally, a short period after the near end user stops talking at point 340, the double talk detector may indicate no further near end speech activity at point 360.

At point 350, the double talk detector indicates the double talk condition and the calculation of spectral mismatches is stopped. The most recently calculated spectral mismatch, however, may not be representative of the residual echo in the system because the, e.g., resulting signal 212 of FIG. 2, included components of the near end user's voice when the spectral mismatch was calculated, just before the point 350 of double talk detection. Instead, the most accurate spectral mismatch will be the last one calculated before the near end user started talking at point 320.

Audio systems and methods in accord with aspects and examples disclosed herein may include a storage memory for storing previously calculated spectral mismatches. Timing or timestamp information may be associated with the stored spectral mismatches, e.g., by express storage of timing information or by management of storage locations according to a timing scheme or other means. A coefficient calculation block may retrieve earlier calculated spectral mismatch data, especially when a newly indicated double talk condition is detected, selected based upon the delay 352 between the near end user starting to talk and the double talk detector indicating such. In some examples, the earlier calculated spectral mismatch data may be selected based upon an estimate of the delay 352. The coefficient calculation block may then calculate new filter coefficients for a post filter based upon the retrieved earlier calculated spectral mismatch data, at least for so long as the double talk condition continues to be indicated.

Figure 4:
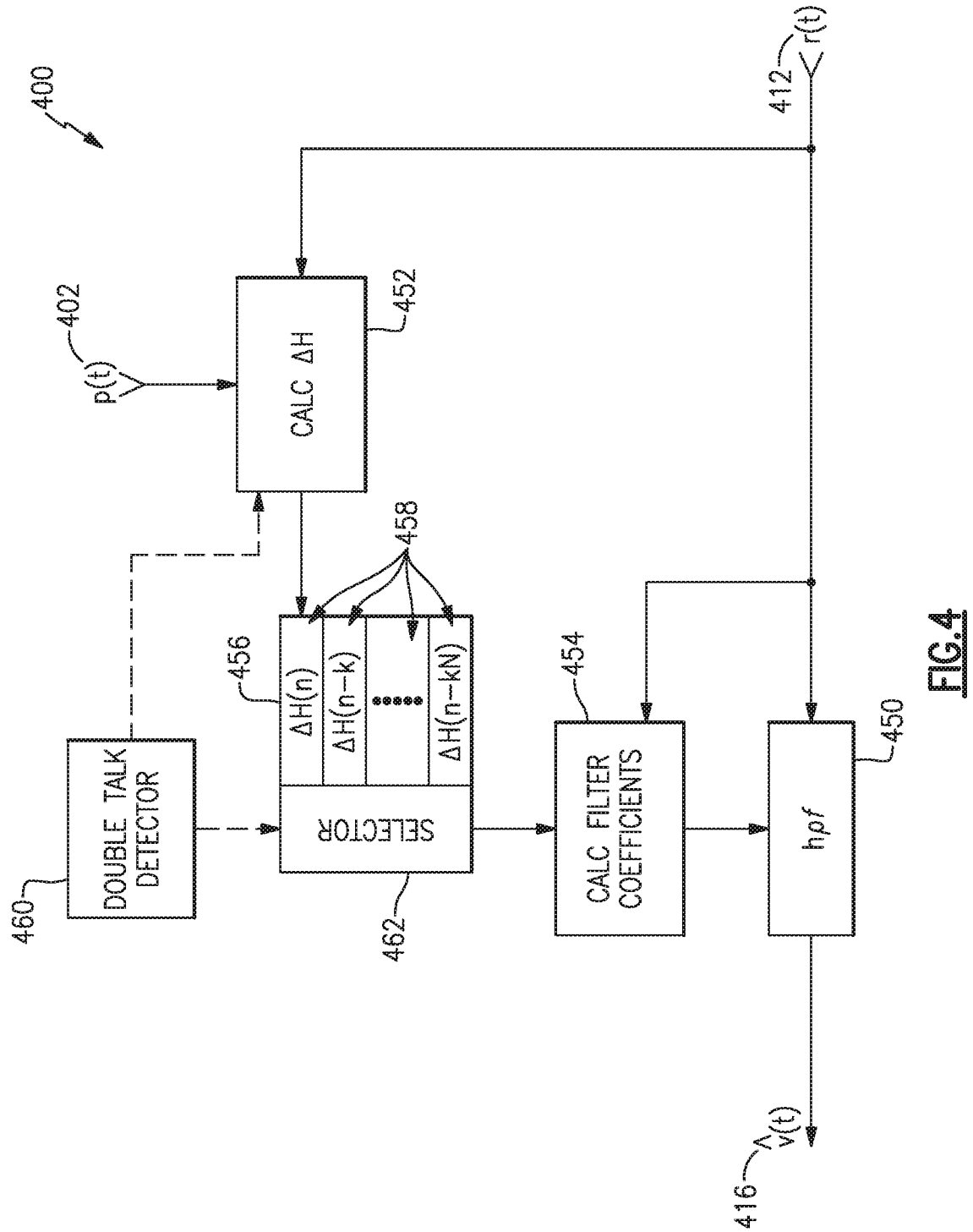
FIG. 4 is a schematic diagram of an example audio system including residual echo suppression with memory of prior spectral mismatches.

FIG. 4 illustrates a portion of an example audio system 400 that includes memory 456 for storing spectral mismatch data 458. Like the audio system 200 of FIG. 2, the audio system 400 receives a residual signal 412, which is a resulting signal after processing by an echo canceler, and spectrally processes it through a post filter 450 to produce a voice estimate signal 416. The post filter 450 is a time varying filter that applies filter coefficients calculated by a coefficient calculation block 454. The coefficient calculation block 454, however, does not necessarily use the most recent spectral mismatch calculated by the spectral analysis block 452. Instead, the coefficient calculation block 454 may use previously stored spectral mismatch data 458, based upon the likelihood that the most recently calculated spectral mismatch may not be reliable, or may be less than optimal. The most recently calculated spectral mismatch, $\Delta H$, may be less than optimal if it was calculated while a user was speaking, possibly due to a delay in the double talk detector 460 to detect and indicate the double talk condition, such as the delay 352 shown in FIG. 3.

Previously calculated spectral mismatch data 458 may be stored in memory 456 at fixed or variable intervals, and not all calculated spectral mismatches are necessarily stored in memory 456. For example, every tenth spectral mismatch may be stored in memory 456, or other fractional storage rates may be used. In some examples, the spectral analysis block 452 may calculate a spectral mismatch, $\Delta H$, at fixed intervals, for example once every millisecond. Alternately, the spectral analysis block 452 may calculate a spectral mismatch at varying intervals, such as more often when the audio system is playing at higher volume or when the program content signal 402 quickly changing spectral content, or a combination of these and/or other conditions, and may calculate a spectral mismatch less often when such conditions are not the case. In some examples, storage of calculated spectral mismatches may occur at fixed intervals while spectral mismatches may be calculated at variable intervals. In various examples, spectral mismatch data may be calculated based upon any suitable fixed or variable interval and based upon fixed time elements and/or varying conditions, and calculated spectral mismatch data may be stored at any suitable fixed or variable interval and/or based upon variable conditions, as discussed in more detail below. Additionally, there may be a maximum amount of stored spectral mismatch data 458 held in memory 456, which may be based upon a furthest back amount of time expected to be necessary to accommodate, e.g., a double talk detector delay such as the delay 352 of FIG. 3.

For example, when the double talk detector 460 indicates that a double talk condition exists, e.g., that a local user is talking, a selector 462 may select or determine a stored spectral mismatch 458 from the memory 456 to be used by the coefficient calculation block 454. In some examples, the selector 462 may select a stored spectral mismatch 458 based upon a fixed amount of prior time. In other examples, the selector 462 may select a stored spectral mismatch 458 based upon a variable amount of time related to other factors. For instance, if the audio system 400 is playing audio content at a high volume, such that the double talk detector 460 is likely to take longer to detect a local user talking, the selector 462 may select a stored spectral mismatch 458 from further back in time. The memory 456, and the stored spectral mismatch data 458, may be managed in numerous ways. For example, a time stamp may be stored with each instance of stored spectral mismatch data 458. Alternately, stored spectral mismatch data 458 may be stored in order, such that a timing associated with each instance of stored spectral mismatch data 458 is identifiable or determined from its storage location within the memory 456.

As discussed above, the selector 462 may select a stored spectral mismatch 458 based upon a fixed or variable amount of time. In certain examples, the double talk detector 460 may be previously characterized, e.g., tested, to determine a typical and/or a longest amount of time for its operation to reliably detect double talk, and the selector 462 may be configured to select stored spectral mismatch data 458 reaching back that determined amount of time. In some examples, the memory 456 may be a first-in-first-out (FIFO) memory, or have alternate shift register type of functionality, and may be configured to hold a fixed amount of stored spectral mismatch data 456. The fixed amount may be associated with the determined typical or maximum amount of time to reliably detect double talk, or may be another amount. In these examples, the selector 462 may be configured to apply a simple binary decision as to which spectral mismatch data to use, e.g., use the incoming, i.e., most recently calculated, spectral mismatch when double talk is not indicated and use the outgoing spectral mismatch when double talk is indicated. In some examples, the size of the memory may be adjustable such that the fixed amount may be changed to accommodate varying fixed time intervals, depending upon, for example, playback volume, background noise level, or other conditions.

In some examples, the selector 462 may be configured to select a stored spectral mismatch 458 based upon a fixed time interval, e.g., reaching back in time, in the range of 5 milliseconds to 400 milliseconds, for example. In other examples, the selector 462 may go back a fixed time interval in the range of 60 milliseconds to 800 milliseconds, or in a range of 25 milliseconds to 250 milliseconds, or a fixed interval of 100 milliseconds, or any other suitable fixed time interval. In other examples, the selector 462 may be configured to select a stored spectral mismatch 458 based upon a variable time interval of, e.g., up to 50 or 100 milliseconds when a playback volume is low, a background noise level is low, or based on any other suitable condition(s), and, e.g., as much as 300 milliseconds, 400 milliseconds, 600 milliseconds, or even more when a playback volume is high, a background noise level is high, or based on any other suitable condition(s). The selected stored spectral mismatch data 458 may be determined in part by a selector 462, such as logic circuitry, program instructions, or any combination of these, which may function in combination with the structure of the memory 456 and/or a memory management scheme and/or other portions or components of the audio system 400 to provide a spectral mismatch to the coefficient calculation block 454.

Figure 5A:
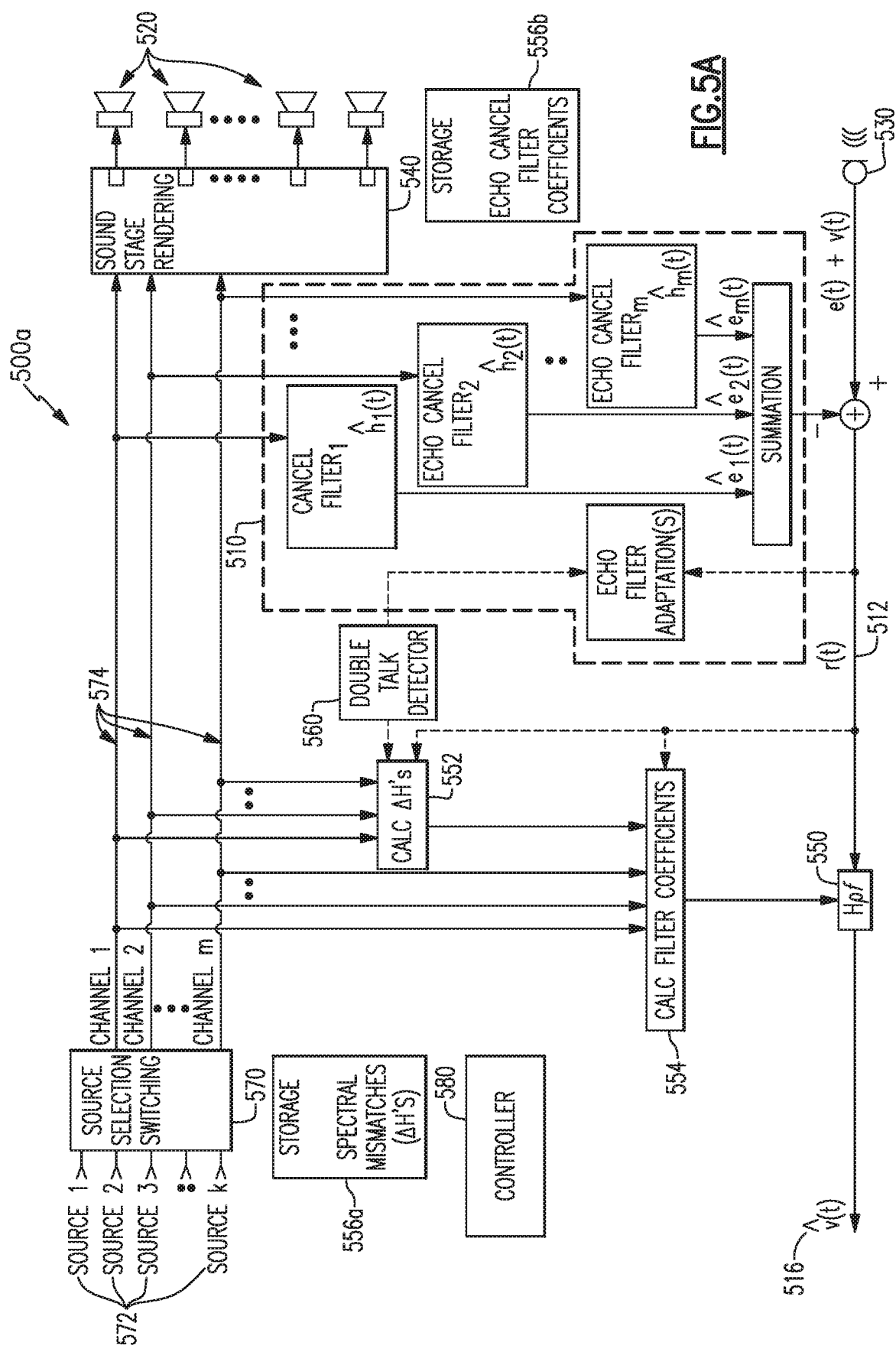
FIG. 5A is a schematic diagram of an example audio system including multi-channel echo cancelation and residual echo suppression.

FIG. 5A illustrates application of post filtering residual echo suppression in a multi-channel audio system in accord with aspects and examples disclosed herein. FIG. 5A shows an example multi-channel audio system 500a that includes source selection switching 570 to allow selection from among multiple sources 572 to provide one or more program content signals to individual content channels 574 for rendering as acoustic signals. The audio system 500a also includes a sound stage processor 540 to control a number of acoustic transducers 520, at least one microphone input and/or microphone 530 to pick up acoustic signals in the environment, including user voices and audio system echoes, an echo cancelation subsystem 510 for estimating the echo signal content of the audio signal provided by the microphone 530, and a post filter 550. The audio system 500a also includes components that support the post filter 550, including a spectral analysis subsystem 552, spectral mismatch storage 556a, coefficient calculation block 554, and a double talk detector 560. Additionally, the audio system 500a includes a controller 580 to manage one or more components of the source selection switching 570, the sound stage processor 540, the echo cancelation subsystem 510, the post filter 550 and supporting components, the double talk detector 560, and/or other components.

In some examples, the echo cancelation subsystem 510, spectral analysis subsystem 552, and the coefficient calculation block 554 may operate on signals or signal channels after processing by the sound stage processor 540, rather than prior to sound stage processing as shown in the figures. For example, the echo cancelation subsystem 510, spectral analysis subsystem 552, and the coefficient calculation block 554 may operate on signals provided directly to the acoustic transducers 520, before or after amplification. In other examples, there may be various signal processing before, after, or both before and after the provision of such signals to the echo cancelation subsystem 510, spectral analysis subsystem 552, and the coefficient calculation block 554.

In some examples, the microphone 530 may be an array of microphones, having array processing to steer beams toward sources of desired acoustic signals and/or away from noise sources, and may additionally or alternately steer nulls toward noise sources. In such examples, the controller 580 may further control such array processing components, or such array processing components may be alternately controlled and/or may be pre-configured for various operating characteristics.

Any of the sources 572 may include hardware for providing an audio signal, such as a radio tuner, navigation system, telephone system, and the like, or may include inputs to accept audio signals from an external device. For example, any of the sources 572 may include one or more physical electrical connections or wireless connections, or any combination of wired and wireless connections, and may include network interfaces to receive (and optionally to provide) various audio signals. Examples include audio jacks, such as 3.5 mm audio jacks, for example, Bluetooth® wireless interfaces and hardware, or the like, network interface jacks and/or connectors, such as an RJ-45 connector, for example, and wireless local area network (WLAN) interfaces and hardware, or any combination of these or other interfaces suitable for conveying audio signal content. Various of these or other interfaces may also include inputs to receive commands and control parameters, such as filter settings, equalization, volume control, or other sound stage parameters, etc.

The echo cancelation subsystem includes a number of echo cancelation filters, each of which is associated with a particular content channel 574. The content channels 574 provide content signals to the sound stage processor 540, from among the sources 572 (as selected by the source selection switching 570 under the control of the controller 580). The sound stage processor 540 provides various processing, such as equalization and loudspeaker routing, to drive the acoustic transducers 520 to generate acoustic sound fields in accordance with the various program content signals and sound stage parameters.

The various sources 572 may provide audio content to be rendered within the environment, such as an interior occupant compartment of a vehicle, and may include numerous types of audio sources, such as radios, telephones, navigation systems, etc. Each of the sources 572 and each subchannel provided by the sources 572 may have differing requirements for sound stage rendering, such as equalization settings and routing to various acoustic transducers 520 or groups of acoustics transducers 520. The various echoes created or caused by the program content signal on each content channel 574 are attempted to be canceled by a respective echo canceler as part of the echo cancelation subsystem 510. As discussed above in the single-channel case, the echo cancelers may not achieve complete removal of echo signals and therefore a residual echo may remain as a component of a resulting signal 512 after action by the echo canceler subsystem.

Similar to the above audio systems 200 and 400, the example audio system 500a includes a post filter 550 to suppress residual echo in the resulting signal 512. The post filter 550 works similarly to the examples described above with reference to FIG. 2 and FIG. 4, to apply spectral enhancement to enhance any user speech content with respect to non-speech content. Unlike the audio systems 200, 400 above, however, spectral mismatch calculations and filter coefficient calculations are configured to accommodate the multiple program content signals among the multiple content channels 574.

The audio system 500a of FIG. 5A is generalized to multiple program content signals among the content channels 574 without regard to any relationship between the program content signals. In the case that the content channels 574 carry signals that are uncorrelated (e.g., statistically independent) the calculation of spectral mismatch values, $\Delta H$'s, may be simplified on a per-channel basis. As illustrated in FIG. 5B, a further example audio system 500b is shown that includes a spectral analysis block 552 that includes multiple sub-blocks 552a, 552b, . . . , 552m, one for each content channel 574. When the signals on each of the content channels 574 are uncorrelated, or are enforced to be uncorrelated, each of the sub-blocks 552a, 552b, . . . , 552m, may calculate a corresponding spectral mismatch, $\Delta H_i$, without regard to the signals on the other of the content channels 574. Further details regarding the calculation of multi-channel spectral mismatches, $\Delta H_i$, are discussed in U.S. patent application Ser. No. 15/668,073 filed on Aug. 3, 2017, and titled MULTI-CHANNEL RESIDUAL ECHO SUPPRESSION, which is incorporated herein by reference.

A further advantage that may be included in audio systems in accord with aspects and examples disclosed herein is an efficient use of spectral analysis blocks such that a large number of various sources 572 may be accommodated while including an efficient number of echo cancelers and spectral analysis blocks. For example, the storage 556 may store and retrieve filter coefficients for the echo cancelers (in storage portion 556b) and store and retrieve spectral mismatches for the spectral analysis blocks (in storage portion 556a), in association with various sound stage parameters and/or configurations. For example, a change in operational status of the audio system, such as a change requested by user input, or a change requested by one of the sources 572, may create or change one or more transfer functions tracked by one or more of the echo cancelers, and accordingly may create or change one or more residual echo characteristics of the system. In the example audio system 500a of FIG. 5A, the echo cancelation filter coefficients and residual echo spectral mismatches may be stored from a prior instant in time when the audio system was operating in a particular state, and appropriate echo cancelation filter coefficients and residual echo spectral mismatches can be retrieved from the storage 556 and loaded into the echo cancelation filters and the spectral analysis blocks, respectively, when a change of operational state is requested.

For example, a particular operational state may include source sub-channels having particular sound stage rendering parameters, and may further include particular microphone processing parameters for the microphone 530, such as array processing in some examples having numerous microphones. Accordingly, any particular set of source-stage-microphone settings may have respective "last used" filter coefficient and spectral mismatch data stored in the storage 556. The stored filter coefficient and spectral mismatch data can be retrieved when the audio system 500a is requested to operate at least one channel with the same (or similar) source-stage-microphone settings. Additionally, actively used filter coefficient and spectral mismatch data (as updated by adaptation) can be stored into the storage 556 when the audio system 500a is requested to cease operating the at least one channel with the particular source-stage-microphone settings, such as upon powering off or upon a new request to operate under different conditions.

Figure 6:
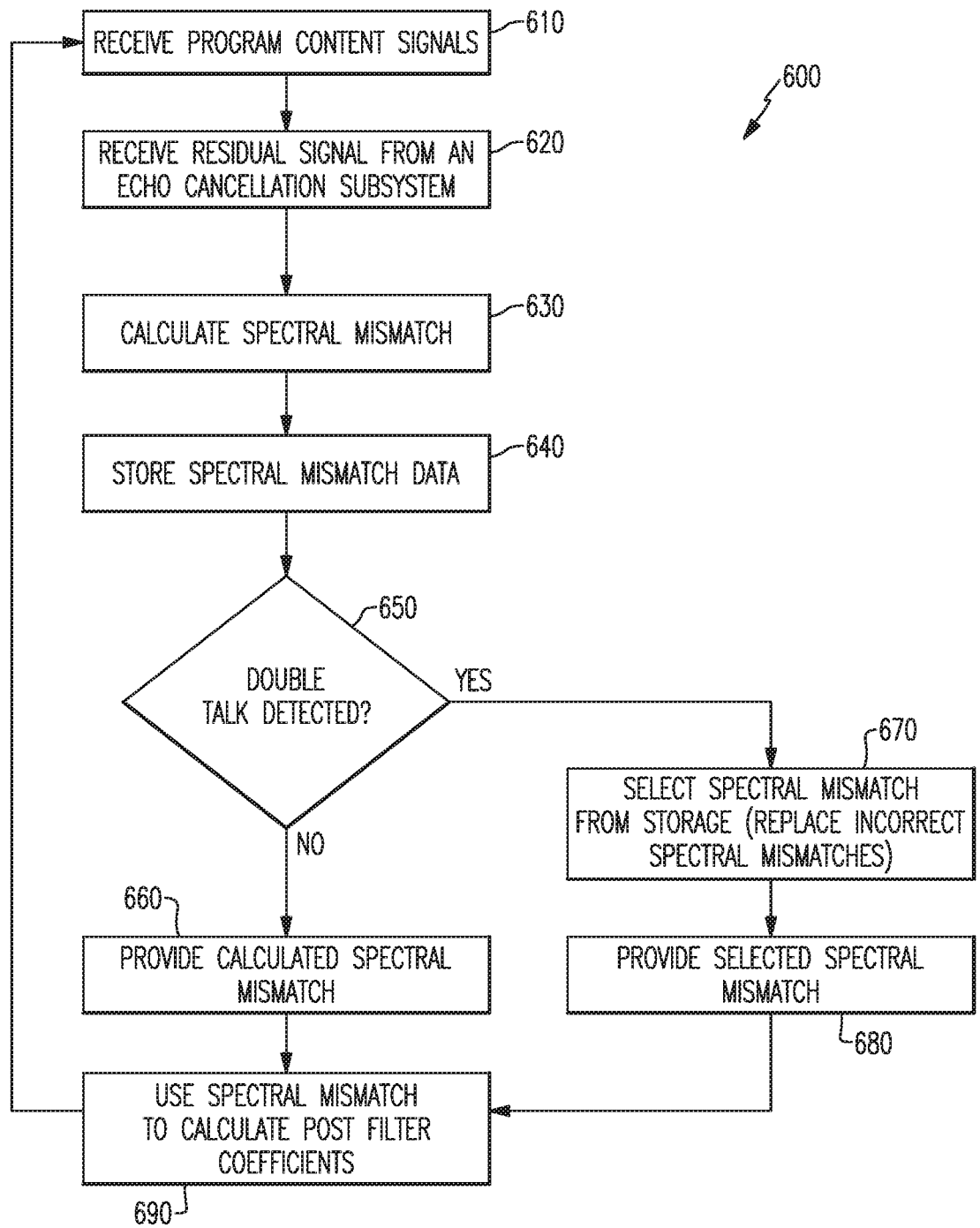
FIG. 6 is a flow diagram of an example method of suppressing residual echo in an audio system.

FIG. 6 illustrates an example operational method 600 that may be performed by an audio system such as the audio system 400 of FIG. 4 or the audio system 500a of FIG. 5A, to suppress residual echo. The method 600 includes receiving one or more program content signals (block 610) and a residual signal from an echo cancelation subsystem (block 620). A spectral mismatch is calculated (block 630) for each program content signal, and at least some calculated spectral mismatches are stored (block 640). If a double talk condition is not detected (block 650), the calculated spectral mismatch is provided (block 660) to a coefficient calculation block. On the other hand, if a double talk condition is detected (block 650), a stored spectral mismatch is selected (block 670) from memory, and any incorrect spectral mismatches previously stored in memory (during the delay in detecting the double talk condition) may be replaced with, e.g., the selected spectral mismatch, and the selected spectral mismatch (block 670) is provided (block 680) to the coefficient calculation block. Filter coefficients are then calculated (block 690) using the provided spectral mismatch.

Figure 7:
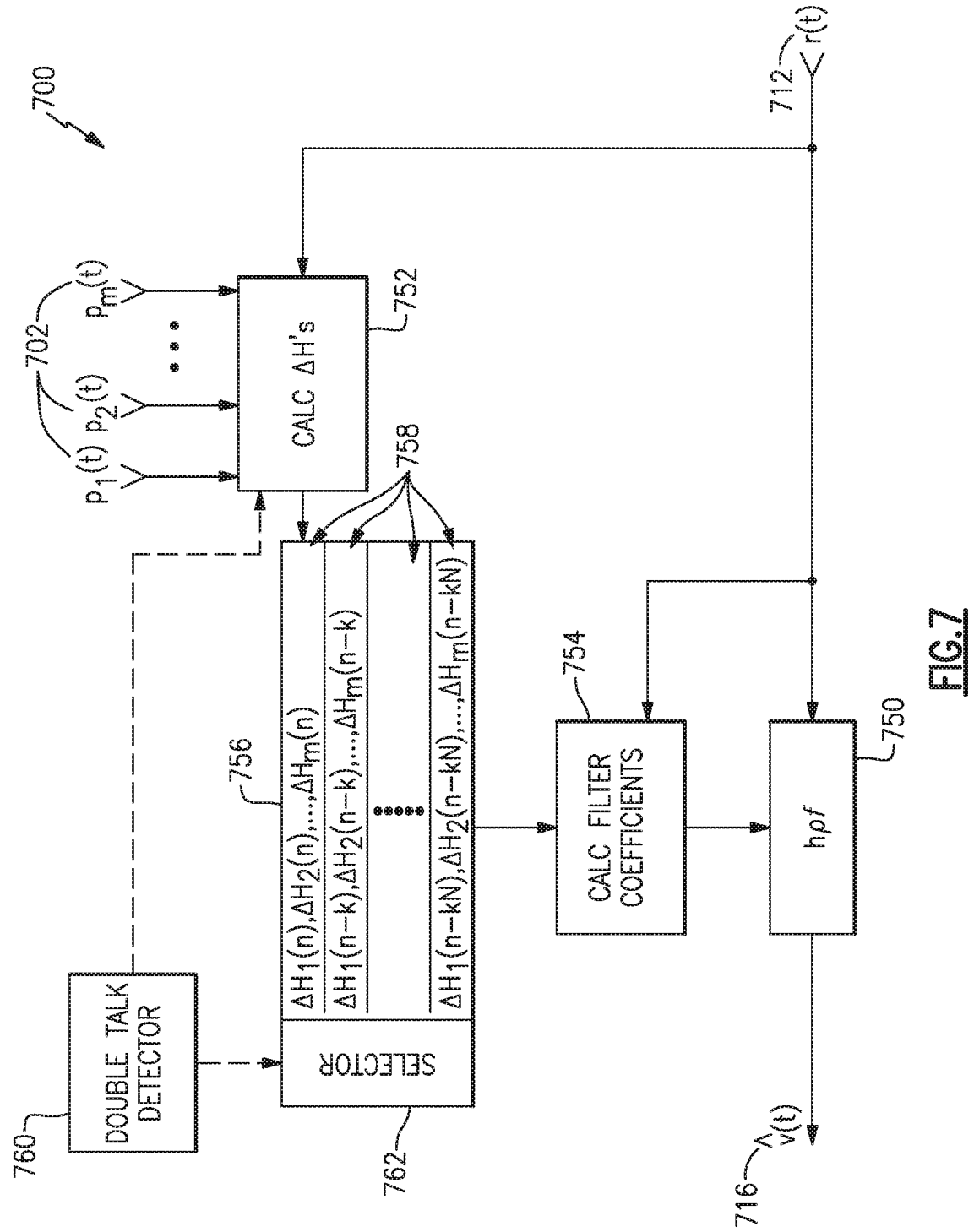
FIG. 7 is a schematic diagram of an example audio system including residual echo suppression with memory of prior spectral mismatches.

FIG. 7 illustrates a portion of an example audio system 700 that includes memory 756 for storing spectral mismatch data 758. Like the audio systems 500a, 500b of FIGS. 5A and 5B, the audio system 700 receives a residual signal 712, which is a resulting signal after processing by an echo cancelation subsystem, and spectrally processes it through a post filter 750 to produce a voice estimate signal 716. The spectral analysis subsystem 752 is a multi-channel subsystem, such as either spectral analysis subsystem 552 shown in FIGS. 5A or 5B. Accordingly, the memory 756 may store multiple spectral mismatches, $\Delta H_i$, one for each channel, for each time (e.g., timestamp) for which spectral mismatches are stored. By way of comparison, the example audio system 400 of FIG. 4 stores multiple spectral mismatches over time, but for only one signal channel. Like the example audio system 400 of FIG. 4, the coefficient calculation block 754 does not necessarily use the most recent spectral mismatch calculated by the spectral analysis block 752 for each channel. Instead, the coefficient calculation block 754 may use previously stored sets of channel-specific spectral mismatch data 758, based upon the likelihood that the most recently calculated spectral mismatches may not be reliable, or may be less than optimal, such as due to a delay in the double talk detector 760 to detect and indicate a double talk condition.

With regard to all aspects and examples discussed herein, a program content signal may have any suitable spectral range, such as, for example, 20 Hz to 20,000 Hz being an acoustic range typically accepted as matching that of the human ear. In some examples, however, removing an echo signal based upon the program content signal may be limited to a narrower spectrum. In certain examples, the microphone signal may be filtered to a narrower bandwidth because it may be intended to pick up human vocal activity, and may only require a lower frequency bound as low as, e.g., 60 Hz, and/or an upper frequency bound as high as, e.g., 8,000 Hz or 10,000 Hz, for example. In certain embodiments, the microphone signal may be filtered, controlled, or otherwise limited to a frequency spectrum in the range of 60 Hz to 8,000 Hz, or from 100 Hz to 4,000 Hz, or any other suitable range.

In some examples, an audio system may include a plurality of acoustic drivers and/or a plurality of microphones, and may include various processing, which may include array processing, to process signals to the acoustic drivers and/or to process signals from the microphones, or a sub-set of either the acoustic drivers or microphones, as appropriate for various applications and/or changing operational requirements.

It should be understood that many, if not all, of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), micro-controller(s), and the like, or any combination of these, may be suitable, and may include analog or digital circuit components and/or other components with respect to any particular implementation. Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, driver, or loudspeaker, may be any of many types of transducers known in the art. For example, an acoustic structure coupled to a magnetic coil positioned in a magnetic field, to cause motion in response to electrical signals received by the coil, may be a suitable acoustic transducer. Additionally, a piezoelectric material may respond to electrical signals by expanding or contracting in one or more dimensions and may be a suitable acoustic transducer. In various examples, acoustic transducers may take other forms.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of suppressing residual echo, comprising:
    determining a first spectral mismatch of an acoustic echo canceler based upon a program content signal and a residual signal;
    storing the first spectral mismatch in a memory;
    determining a second spectral mismatch of the acoustic echo canceler based upon the program content signal and the residual signal at a different time than the first spectral mismatch;
    selecting one of the first spectral mismatch or the second spectral mismatch;
    calculating a filter coefficient based upon the selected spectral mismatch; and
    filtering the residual signal based upon the calculated filter coefficient.

2. The method of claim 1 wherein selecting one of the first spectral mismatch or the second spectral mismatch is based at least in part upon detecting a double-talk condition.

3. The method of claim 1 wherein selecting one of the first spectral mismatch or the second spectral mismatch is based at least in part upon a sound stage configuration selected for rendering the program content signal into an acoustic signal.

4. The method of claim 1 further comprising storing additional spectral mismatches in the memory to provide a plurality of stored spectral mismatches.

5. The method of claim 4 further comprising detecting a double talk condition and wherein selecting one of the first spectral mismatch or the second spectral mismatch includes selecting one of the plurality of stored spectral mismatches based on an amount of time for the double talk condition to be detected.

6. The method of claim 4 wherein selecting one of the first spectral mismatch or the second spectral mismatch includes selecting one of the plurality of stored spectral mismatches based upon a sound stage configuration selected for rendering the program content signal into an acoustic signal.

7. The method of claim 1 further comprising storing an association of the first spectral mismatch with a sound stage configuration selected for rendering the program content signal into an acoustic signal.

8. A residual echo suppression system, comprising:
    a content signal input configured to receive an audio signal;
    a residual input configured to receive a residual signal from an echo cancelation system;
    a processor and a memory, the processor configured to:
        determine a first spectral mismatch based at least upon the residual signal and the audio;
        store the first spectral mismatch in the memory;
        determine a second spectral mismatch based at least in part upon the residual signal and the audio signal at a different time than the first spectral mismatch;
        select one of the first spectral mismatch or the second spectral mismatch; and
        calculate a set of filter coefficients based at least in part upon the selected spectral mismatch; and
    a filter configured to filter the residual signal using the calculated set of filter coefficients.

9. The residual echo suppression system of claim 8 further comprising a double talk detector configured to indicate to the processor when a local user is speaking, the processor further configured to select the selected spectral mismatch based at least in part upon the indication.

10. The residual echo suppression system of claim 8 wherein the processor is further configured to select the selected spectral mismatch based at least in part upon an indication from a double talk detector.

11. The residual echo suppression system of claim 8 wherein the processor is further configured to select the selected spectral mismatch based at least in part upon an amount of time for a double talk detector to detect a double talk condition.

12. The residual echo suppression system of claim 8 wherein the processor is further configured to select the selected spectral mismatch based at least in part upon a sound stage configuration selected for rendering the program content signal into an acoustic signal.

13. The residual echo suppression system of claim 8 wherein the memory is further configured to store an association of at least one of the first spectral mismatch and the second spectral mismatch with a sound stage configuration selected for rendering the program content signal into an acoustic signal.

14. An audio system comprising:
    a plurality of inputs, each of the plurality of inputs to receive an audio signal;
    a signal processing subsystem coupled to the plurality of inputs and configured to provide a processed signal based upon at least a portion of the plurality of audio signals to a loudspeaker for rendering an acoustic signal;
    a microphone input to receive a microphone signal having an echo component of the acoustic signal;
    an echo cancelation subsystem configured to provide an estimated echo signal from the plurality of audio signals, to receive the microphone signal, and to subtract the estimated echo signal from the microphone signal to provide a residual signal; and
    a residual echo suppression subsystem configured to determine and store in memory a first spectral mismatch between the residual signal and at least one of the plurality of audio signals, to determine a second spectral mismatch between the residual signal and the at least one of the plurality of audio signals at a different time than the first spectral mismatch, to select one of the first spectral mismatch or the second spectral mismatch upon which to calculate a set of filter coefficients, and to filter the residual signal using the set of filter coefficients.

15. The audio system of claim 14 wherein the residual echo suppression subsystem is configured to select the one of the first spectral mismatch or the second spectral mismatch based at least in part upon an indication from a double talk detector.

16. The audio system of claim 14 wherein the residual echo suppression subsystem is configured to select the one of the first spectral mismatch or the second spectral mismatch based at least in part upon a sound stage configuration selected for rendering the program content signal into an acoustic signal.

17. The audio system of claim 14 wherein the residual echo suppression subsystem is further configured to determine and store additional spectral mismatches in the memory to provide a plurality of stored spectral mismatches.

18. The audio system of claim 17 wherein the residual echo suppression subsystem is configured to select the one of the first spectral mismatch or the second spectral mismatch by selecting one of the plurality of stored spectral mismatches based on an amount of time for a double talk detector to detect a double talk condition.

19. The audio system of claim 17 wherein the residual echo suppression subsystem is configured to select the one of the first spectral mismatch or the second spectral mismatch by selecting one of the plurality of stored spectral mismatches based upon a sound stage configuration selected for rendering the program content signal into an acoustic signal.

20. The audio system of claim 14 further comprising storing an association of the first spectral mismatch with a sound stage configuration selected for rendering the program content signal into an acoustic signal.

* * * * *